Figure 1:
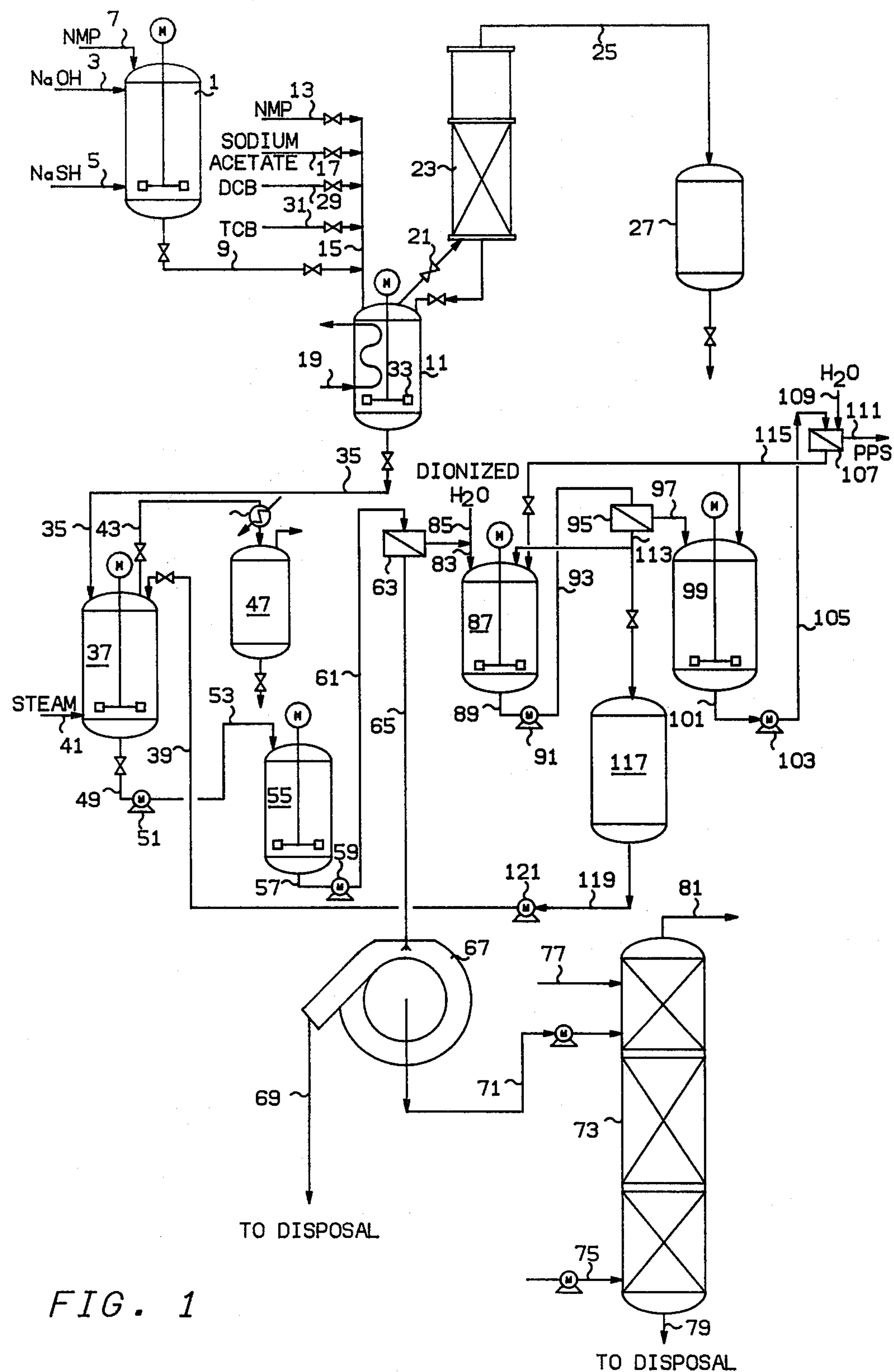

United States Patent [19]
Scoggins et al.

[11] 4,415,729
[45] Nov. 15, 1983

[54] RECOVERING GRANULAR POLY(ARYLENE SULFIDE) PARTICLES FROM A POLY(ARYLENE SULFIDE) REACTION MIXTURE

[75] Inventors: Lacey E. Scoggins; Bradley L. Munro, both of Bartlesville, Okla.

[73] Assignee: Phillips Petroleum Company, Bartlesville, Okla.

[21] Appl. No.: 385,223

[22] Filed: Jun. 4, 1982

[51] Int. Cl.$^3$ .............................................. C08G 75/14
[52] U.S. Cl. ................................ 528/388; 264/176 R
[58] Field of Search .................... 528/388; 264/176 R

[56] References Cited

U.S. PATENT DOCUMENTS 3,687,907 8/1972 Crouch et al. .................... 260/79.1
3,697,487 10/1972 Cines ................................ 260/79.1
3,839,302 10/1974 Miles .................................. 260/79
3,919,177 11/1975 Campbell ........................... 528/388

*Primary Examiner*—Melvyn I. Marquis

[57] ABSTRACT

A method for recovering granular poly(arylene sulfide) from a polymerization reaction mixture at a temperature above that at which poly(arylene sulfide) is in molten phase comprising polar organic solvent and poly(arylene sulfide) in which, in the presence of a sufficient amount of separation agent to cause a phase separation of molten poly(arylene sulfide) and polar organic solvent, the temperature of the polymerization reaction mixture is reduced sufficiently to solidify the poly(arylene sulfide) to produce a slurry comprising particulate poly(arylene sulfide) in polar organic solvent. In a preferred embodiment a slurry comprising particulate poly(phenylene sulfide) in N-methyl-2-pyrrolidone is produced using water, and optionally an alkali metal carboxylate, as separation agent.

25 Claims, 1 Drawing Figure

RECOVERING GRANULAR POLY(ARYLENE SULFIDE) PARTICLES FROM A POLY(ARYLENE SULFIDE) REACTION MIXTURE

BACKGROUND OF THE INVENTION

This invention relates to processes for the production of polymers from aromatic compounds. In one of its aspects, this invention relates to processes for the production of arylene sulfide polymers. In another of its aspects, this invention relates to the separation of solid and liquid components of the reaction mixture of the reaction of polyhalo-substituted aromatic compounds in polar organic solvent to provide poly(arylene sulfide). In still another of its aspects, this invention relates to the recovery of relatively large particulate poly(arylene sulfide) from its reaction mixture. In still another aspect of the invention, it relates to the recovery of particulate poly(arylene sulfide) by separation from the other components of its reaction mixture.

In one concept of this invention it provides a method for separating the reaction mixture of the reaction of polyhalo-substituted aromatic compounds and polar organic solvent which has produced poly(arylene sulfide) into a particulate poly(arylene sulfide) that is recovered from the reaction mixture and other components that can be separated for recovery or disposal.

A basic process for the production of arylene sulfide polymers from polyhalo-substituted cyclic compounds containing unsaturation between adjacent ring atoms, wherein the halogen atoms attached to ring carbon atoms react with an alkali metal sulfide in a polar organic compound at an elevated temperature is disclosed in U.S. Pat. No. 3,354,129. Since the disclosure of that invention a great amount of experimental work has been completed which resulted in the disclosure of methods for both batch and continuous operations to produce poly(arylene sulfides) not only from p-dihalobenzenes but also containing polyhalo aromatic compounds having more than two halogen substituents per molecule and with the addition of various polymerization modifying compounds such as alkali metal carboxylates. Processes have also been disclosed in which various reactants can be premixed to form reaction complexes before all of the reactants are brought together at polymerization conditions. All of these processes have in common the production at a temperature above that at which poly(arylene sulfide) is in molten phase, of a reaction mixture containing poly(arylene sulfide) and a polar organic solvent along with various impurities and unreacted reactants from which solid poly(arylene sulfide) is recovered.

In the past a solvent flashing process has generally been used to recover a powdery resin from the reaction mixture. This powdery resin has proved to be difficult to filter from the arylene sulfide oligomers that are byproducts of the polymerization, has resulted in a product that when dried is excessively dusty, has necessitated pelletizing the powder for extrusion purposes, and has resulted in other problems commonly associated with products of relatively low bulk density. Increasing the size of the particulate poly(arylene sulfide) produced from the processes described above would result in alleviating these problems. The present invention provides a process by which arylene sulfide polymers having relatively larger, coarser particles can be recovered from reaction mixtures containing poly(arylene sulfide) and polar organic solvent.

It is therefore an object of this invention to provide a method for recovering relatively large, granular poly(arylene sulfide) particles from a reaction mixture containing poly(arylene sulfide) and polar organic solvent. It is another object of this invention to provide a method for recovering poly(arylene sulfide) having a particle size distribution resulting in improved filterability and reduced dustiness as compared to the resin recovered by solvent flashing methods. It is still another object of the invention to provide a method for recovering poly(arylene sulfide) having a particle size distribution that will eliminate the need for pelletizing the recovered particles prior to extrusion. It is still another object of the invention to produce poly(arylene sulfide) having a generally higher bulk density than is produced by solvent flashing methods of recovering the polymer from its reaction mixture. It is still another object of this invention to provide a method for recovery of poly(arylene sulfide) which facilitates separation of arylene sulfide oligomers from the reaction mixture. It is another object of this invention to produce useful manufactured articles from poly(arylene sulfide) recovered by the method of this invention.

Other aspects, concepts, and objects of this invention will become apparent to those reading this disclosure and studying the appended drawings and claims.

STATEMENT OF THE INVENTION

In accordance with this invention a method is provided for recovering granular poly(arylene sulfide) from a polymerization reaction mixture, at a temperature above that at which poly(arylene sulfide) is in molten phase, comprising polar organic solvent, alkali metal halide by-product and poly(arylene sulfide). In this method the temperature of the polymerization reaction mixture is reduced sufficiently to produce a slurry comprising particulate poly(arylene sulfide) in polar organic solvent while the reaction mixture is in the presence of an amount of a liquid soluble in the polar organic solvent but not itself a solvent for poly(arylene sulfide), preferably water, sufficient to cause a phase separation of molten poly(arylene sulfide) from the polar organic solvent.

The invention can also be stated as a method for recovering granular poly(arylene sulfide) from a polymerization reaction mixture, at a temperature above that at which poly(arylene sulfide) is in molten phase, containing polar organic solvent, alkali metal halide by-product and poly(arylene sulfide) in which the polymerization reaction mixture is contacted with an amount of a liquid soluble in the polar organic solvent but not itself a solvent for poly(arylene sulfide), preferably water, sufficient to cause phase separation of molten poly(arylene sulfide) from polar organic solvent with subsequent reduction of the temperature of the separated phases to a degree sufficient to produce a slurry of particulate poly(arylene sulfide) in polar organic solvent.

In accordance with further embodiments of the invention the reaction mixture, after the production of the slurry of particulate poly(arylene sulfide) in polar organic solvent, is subjected to further treatments to separate and recover arylene sulfide polymer particles and to separate and recover or dispose of the other components of the reaction mixture.

The process of the present invention is suitable for use in recovering poly(arylene sulfide) produced by any method that results in a reaction mixture containing a molten poly(arylene sulfide), polar organic solvent, various impurities, and unreacted reactants. The most common of impurities will be by-product alkali metal halide—principally sodium chloride (NaCl)—and poly(arylene sulfide) oligomers which are gelatinous materials commonly described as "slime" because of their physical properties. Processes that will produce such a reaction mixture are set forth in U.S. Pat. No. 3,354,129 and its derivatives in which polyhalo-substituted aromatic compounds are reacted with sulfur-containing reactants in a polar organic solvent, optionally with polymerization modifying compounds, either in batch or continuous operations. Reaction mixture that can be treated by the process of this invention also include those in which components of the reaction mixture are premixed to form complexes before all of the components are brought together under polymerization conditions.

Although other components are not excluded from the reaction mixture, in general, arylene sulfide polymers treated by the process of this invention are phenylene sulfide polymers produced by the contacting of at least one p-dihalobenzene, under polymerization conditions for a period of time sufficient to form a phenylene sulfide polymer, with a mixture in which at least one alkali metal sulfide or other sulfur sources and a polar organic solvent, often with the addition of such optional components as a minor amount of a polyhalo aromatic compound having more than two halogen substituents per molecule, and/or a polymerization modifying compound such as an alkali metal carboxylate or a lithium halide. Some of the more common components of these reaction mixtures are listed below:

p-Dihalobenzenes which can be employed by the process of this invention can be presented by the formula

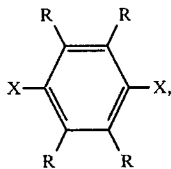

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecular being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichloro benzene, 1-octadecyl-2,5-diiodobenzene, 1-phenyl-2-chloro-5-bromobenzene, 1-(p-tolyl)-2,5-dibromobenzene, 1-benzyl-2,5-dichlorobenzene, 1-octyl-4-(3-methylcyclopentyl)-2,5-dichlorobenzene, and the like and mixtures thereof.

Polyhalo aromatic compounds having more than two halogen substituents per molecule which can be employed in the process of this invention can be represented by the formula $R'X'_n$, where each X' is selected from the group consisting of chlorine and bromine, preferably chlorine, n is an integer of 3 to 6, and R' is a polyvalent aromatic radical of valence n which can have up to about 4 methyl substituents, the total number of carbon atoms in R' being within the range of 6 to about 16.

Examples of some polyhalo aromatic compounds having more than two halogen substituents per molecule which can be employed in the process of this invention include 1,2,3-trichlorobenzene, 1,2,4-trichlorobenzene, 1,3-dichloro-5-bromobenzene, 2,4,6-trichlorotoluene, 1,2,3,5-tetrabromobenzene, hexachlorobenzene, 1,3,5-trichloro-2,4,6-trimethylbenzene, 2,2',4,4'-tetrachlorobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Alkali metal sulfides which can be employed in the process of this invention include lithium sulfide, sodium sulfide, potassium sulfide, rubidium sulfide, cesium sulfide, and mixtures thereof. Preferably, the alkali metal sulfide is used as a hydrate or as an aqueous mixture. If desired, the alkali metal sulfide can be prepared as an aqueous solution by the reaction of an alkali metal hydroxide with an alkali metal bisulfide in aqueous solution.

Alkali metal carboxylates which can be employed in the process of this invention can be represented by the formula $R''CO_2M$, where R'' is a hydrocarbyl radical selected from alkyl, cycloalkyl, and aryl, and combinations thereof such as alkaryl, aralkyl, and the like, the number of carbon atoms in said R'' being within the range of 1 to about 20, and M is an alkali metal selected from lithium, sodium, potassium, rubidium and cesium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octanoate, sodium heneicosanoate, lithium cyclohexanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures thereof.

The amount of alkali metal carboxylate generally used as a polymerization modifier in the polymerization reaction—usually about 0.05 to about 4, preferably about 0.1 to about 2 gram-moles carboxylate/gram-mole of p-dihalobenzene—will serve to reduce the amount of separating agent needed in this invention.

Lithium halides which can be employed in the process of this invention include lithium chloride, lithium bromide, lithium iodide, and mixtures thereof.

Alkali metal hydroxides which can be employed in the process of this invention include lithium hydroxide, sodium hydroxide, potassium hydroxide, rubidium hydroxide, cesium hydroxide, and mixtures thereof.

The polar organic solvents useful in the present invention are solvents for the polyhalo aromatic compounds and the alkali metal sulfides used in the production of arylene sulfide polymers. Examples of such polar organic solvents include amides, including lactams, and sulfones. Specific examples of such polar organic solvents include hexamethylphosphoramide, tetramethylurea, N,N'-ethylenedipyrrolidone, N-methyl-2-pyrrolidone (NMP), pyrrolidone, caprolactam, N-ethylcaprolactan, sulfolane, N,N'-dimethylacetamide, low molecular weight polyamides, and the like. The polar organic solvent presently preferred is N-methyl-2-pyrrolidone (NMP).

Water is the preferred agent for causing separation of molten poly(arylene sulfide) from the polar organic solvent; however, any liquid can be used (1) that is soluble in the polar organic solvent used in the reaction mixture; (2) that is not itself a solvent for poly(arylene sulfide) and (3) that has boiling characteristics suitable for the reaction and recovery conditions of this process. In general, paraffinic hydrocarbons, higher boiling alcohols, and higher boiling ethers are suitable compounds for use alone or in mixture.

Although the reaction temperature at which the polymerization is conducted can vary over a wide range, generally it will be within the range of about 420° F. to about 600° F., preferably about 435° F. to about 540° F. The reaction time can vary widely, depending in part on the reaction temperature, but generally will be within the range of about 10 minutes to about 72 hours, preferably about 1 hour to about 8 hours. The pressure should be sufficient to maintain the N-methyl-2-pyrrolidone, the p-dihalobenzene, and the polyhalo aromatic compound having more than two halogen substituents per molecule, if used, substantially in the liquid phase.

Polymerization of various components set out above can with other components well known in the art result in a reaction mixture at a temperature above that at which poly(arylene sulfide) is in molten phase comprising poly(arylene sulfide), polar organic diluent, arylene sulfide oligomers ("slime"), sodium chloride, and unreacted reactants as the major components of the reaction mixture. For commercial purposes, currently most usually, the poly(arylene sulfide) would be poly(phenylene sulfide) (PPS) and the polar organic solvent would be N-methyl-2-pyrrolidone (NMP). The present invention provides a method for converting the poly(arylene sulfide) in the reaction mixture into relatively large, coarse particulate poly(arylene sulfide) that is readily separable from the other components of the reaction mixture.

In those reaction mixtures that are anhydrous or that contain relatively little separation agent, usually water, it has been found that the addition of separation agent, preferably deionized water, will cause a phase separation between the molten poly(arylene sulfide) and the polar organic solvent. In the preparation of poly(arylene sulfide) using alkali metal carboxylate sufficient separation agent can be present in the reaction mixture to cause the phase separation between molten poly(arylene sulfide) and polar organic solvent, but the addition of separation agent, preferably deionized water, to this mixture can enhance the separation. When alkali metal carboxylate is not present it has been found that the presence of about 0.01 to about 0.5 pounds of separation agent/pound of solvent, preferably 0.05 to about 0.2 pounds of separation agent/pound of solvent, in the reaction mixture is sufficient to cause the phase separation desired. When alkali metal carboxylate is present, generally a lesser amount of separation agent is necessary to cause phase separation. Preferably, about 0.05 to about 0.15 pounds of separation agent/pound of solvent is then required.

After the phase separation has been accomplished the temperature of the separated phases is lowered from the range in which the poly(arylene sulfide) is molten into the range in which it solidifies. In general, PPS mixtures have a transition temperature of 425° F.±10° F. depending on impurities. Described in another way, the temperature of the molten poly(arylene sulfide) is then decreased from the range of about 500° to about 600° F. to a temperature below 350° F., i.e. within the range of about 300° to about 350° F. The lowering of the temperature after the phase separation of the molten poly(arylene sulfide) causes the arylene sulfide polymer to form into relatively large, coarse particles—of about 0.04 to about 4 mm, preferably about 0.1 to about 2 mm size range—in contrast to the fine powder produced by prior methods of recovery of the polymer. By the present method a slurry of particulate poly(arylene sulfide) in polar organic solvent is produced which can then be separated and refined by conventional means.

To illustrate the operation of the present invention a preferred operation in a continuous process will be described below in conjunction with the drawing which is a schematic representation of a process for producing poly(phenylene sulfide) (PPS), for recovering PPS resin by the process of this invention, and for recovering N-methyl-2-pyrrolidone (NMP) solvent. The elements of the recovery system are known to be separately operable, but all of the elements have not been actually operated in the integrated process described. This illustration has been chosen as a relatively sophisticated continuous production and recovery operation which embodies relatively simpler operations for producing the reaction mixture by batch processes.

Referring now to the drawing, aqueous solutions of NaOH and NaSH are fed into stirred vessel 1 through lines 3 and 5 respectively for neutralization to yield primarily a dissolved $Na_2S$. NMP is fed through line 7 into the stirred vessel 1 to flush all of the material from vessel 1 through line 9 into stirred vessel 11 which serves as the dehydration and polymerization reactor. All of the lines from the stirred vessel 1 are then flushed with nitrogen gas and then vented through reaction vessel 11.

NMP charged through lines 13 and 15, and sodium acetate charged through lines 17 and 15 are introduced into the dehydration/polymerization vessel 11 to provide a mixture of water, NMP, sodium sulfide and sodium acetate in this vessel. Optionally, the sodium acetate can be replaced by charging NaOH and acetic acid into the dehydration/polymerization vessel 11 so that the sodium acetate is prepared in-situ. The mixture of water, NMP, sodium sulfide and sodium acetate is heated by means of heat transfer coils 19 containing hot oil. Rising vapors passing through line 21 are fractionated in the distillation column 23, and condensed water vapor is passed through line 25 to be collected in dehydration accumulator 27. After the dehydration process, the dehydration column 23 is isolated from dehydration/polymerization vessel 11 and p-dichlorobenzene (DCB) is added to vessel 11 through lines 29 and 15 and, optionally, 1,2,4-trichlorobenzene (TCB) is added to reactor 11 through lines 31 and 15. The mixture is heated under polymerization conditions to form a reaction mixture containing a molten PPS resin, unreacted reactants, phenylene sulfide oligomers ("slime"), sodium chloride, NMP and water.

Since sodium acetate and water are present in the reaction mixture a small amount of deionized water can, optionally, be charged to the polymerization vessel 11 on completion of the polymerization to facilitate the separation of the molten PPS phase from the second liquid phase comprising NMP, phenylene sulfide oligomers, sodium chloride and the unreacted reactants. If sodium acetate is not used in the reaction or an anhydrous reaction mixture or reaction mixture containing relatively little water results from the reaction, a sufficient amount of deionized water can be added to cause separation of the molten PPS phase from the second liquid phase. During the phase separation the reaction mixture is vigorously stirred by agitator 33 and the temperature of the reactor is reduced so that after the separation the liquid PPS phase gradually solidifies as its temperature drops below the transition temperature. There is produced a slurry of coarse particulate PPS in the reaction mixture.

This mixture was then transferred through line 35 into a stirred dilution tank 37. Water is added through line 39 in a sufficient quantity to dissolve the major portion of soluble salts. Steam is introduced through line 41 at the bottom of the tank 37 mainly for the purpose of driving off unreacted DCB as vapor through line 43. Steam and DCB are condensed in heat exchanger 45 and collected in receiver 47 from which they can be fed to a fractionator (not shown) for DCB and water recovery.

The effluent from dilution tank 37 is charged through line 49, pump 51 and line 53 to stirred slurry tank 55. Here, further de-ashing (i.e. dissolving of salt and other impurities), is carried out. The de-ashed slurry is transferred through line 57, pump 59 and line 61 to porous metal screen 63 where solids are collected as a filter cake and the filtrate is passed through line 65 to a vacuum drum filter 67 precoated with a suitable filter aid such as diatomaceous earth or cellulose fibers. Dispersed "slime" is retained on the filter coating, which is scraped off at certain time intervals and replaced by a fresh coating. Scraped-off filter aid/"slime" waste material is passed through line 69 to be discarded. This facilitated ability to separate "slime" from the particulate polymer is a material advanced in the art.

Clarified filtrate comprising mainly water, sodium chloride and NMP is charged through line 71 to the upper portion of an extraction column 73, which is equipped with a suitable packing material (conventional perforated trays could also be used). An extractant, preferably n-hexanol, is added through line 75 into the lower portion of extraction column 73. Extractant flows upward to extract NMP from the brine feed which flows downward in the column. Optionally, the brine can be concentrated by partial evaporation of water before it is fed into the extraction column to enhance the extraction efficiency based on the well-known "salting out" effect.

Distilled or deionized water from line 77 is injected into the extraction column 73 at a point above the brine feed entry to wash the extract comprising n-hexanol and NMP and to remove traces of sodium chloride. The bottom raffinate comprising water and dissolved salt is passed through line 79 for disposal in a suitable manner, e.g., in a brine well. The top extract comprising n-hexanol and NMP is passed through line 81 to fractionators (not shown) for recovery of both organic solvents which are then recycled.

The filter cake from porous metal screen 63 is passed through line 83 along with deionized water from line 85 to be slurried in wash tank 87 which is an agitated tank providing contact between the slurry and the wash water further to de-ash the PPS particles. Effluent from tank 87 is passed through line 89, pump 91 and line 93 to a second porous metal screen 95 for separation of filtrate and filter cake. The filter cake from porous metal screen 95 is passed through line 97 to wash tank 99 which is another agitated vessel for reslurrying and further de-ashing. Effluent from wash tank 99 is passed through line 101, pump 103 and line 105 to a third porous metal screen 107 on which the PPS is washed with water from line 109 and transferred to line 111 as recovered PPS which is then dried and, optionally, air-cured.

The filtrate from porous metal screens 95 and 107 are passed through transfer lines 113 and 115 respectively to be apportioned to wash tanks 87 and 99 or to be stored in filtrate holding tank 117. The filtrate in holding tank 117 is passed through line 119, pump 121 and line 39, to the stirred dilution tank 37.

The following are examples illustrating the process of the present invention. They are to be taken as illustrative and not exclusive.

EXAMPLE I

In this example the preparation of poly(phenylene sulfide) (PPS) from an aqueous mixture of sodium sulfide, N-methylpyrrolidone (NMP) and p-dichlorobenzene (DCB) and its recovery by conventional solvent flashing is described. The PPS resin prepared by this solvent flash recovery method will be used in a later example as a control polymer for comparative purpose.

An aqueous sodium sulfide solution was prepared by mixing 76.5 lb of a 50.35 weight percent NaOH solution with 96.9 lb of a solution containing 58.62 weight percent of NaHS and 0.29 weight percent of $Na_2S$. This solution plus 34 gallons of NMP were added to an agitated pilot plant reactor, which was then purged with nitrogen. This mixture was first heated for 15 minutes at an essentially constant temperature of about 330° F. under a pressure of 17 psig and then dehydrated by raising the temperature to a final temperature of 449° F. during a time period of 2 hours.

Subsequently 148.1 lb of DCB were charged to the reactor, and the entire reactor mixture was heated for 2 hours at a temperature ranging from 431° F. (initial) to 450° F., at a pressure ranging from 27 psig (initial) to 82 psig. The reactor temperature was then raised to about 509° F. and the pressure increased to about 180 psig during a time interval of 35 minutes. Continued heating of the reactor mixture was carried out at about 509° F. and a pressure of 180–195 psig for 90 minutes.

The polymerization mixture was concentrated by partial solvent flashing at about 509° F. while the pressure was reduced from 190 psig to 46 psig during a time interval of 100 minutes. Finally the partially desolventized slurry was further heated to about 540° F., pressured to 150 psi with nitrogen, and flashed in a blended heated to 470° F. for 50 minutes. The dry salt-filled PPS was first washed with 120 gallons of deionized water at ambient temperature and then twice with 80 gallons each of hot deionized water at 350° F./150 psig. The filter cake was then dried at 200°–300° F. and atmospheric pressure for about 3 hours.

EXAMPLE II

This example describes the recovery of PPS by the novel process of this invention comprising the steps of adding water to the hot completed polymerization mixture, cooling the polymerization mixture while being agitated, diluting this mixture with water, and filtering it for PPS recovery.

An aqueous sodium sulfide solution was prepared by neutralizing 78.0 lb of a 50.35 weight percent NaOH solution with 96.9 lb of a solution containing 58.62 weight percent of NaHS and 0.29 weight percent of $Na_2S$. This solution plus 34.0 gallons of NMP were added to a stirred (400 r.p.m.) pilot plant reactor, which was then purged with nitrogen. This mixture was dehydrated according the procedure described in Example I.

146.4 lb of DCB were charged to the reactor, which was then heated for 2 hours at a temperature of 434°-450° F. and a pressure ranging from 36 psig (initial) to 75 psig. The reactor temperature was raised to about 510° F., while the pressure rose to about 175 psig. Finally, the polymerization was completed by heating for 3 hours at 510° F. and a pressure of 175-195 psig.

In order to accomplish a phase separation into liquid PPS and the NMP solution, 35 lb of liquid water were added to the reactor while the reactor mixture was stirred at a rotor speed of about 350-400 rpm. In addition, 6 lb of sodium acetate were charged to reduce an excessive water vapor pressure buildup. The entire agitated reactor mixture was reheated until a temperature of about 510° F. and a pressure of 335 psig were attained. Subsequently, the agitated mixture was cooled to about 250° F./25 psig during a period of 2 hours and diluted with 60 gallons of deionized water in a blend tank.

The slurry was filtered through a 60 mesh metal screen in a Nutsche vacuum filtration unit and washed with 20 gallons of deionized water. Further washing and drying of the PPS polymer was carried out according to the procedure described in Example I.

More recent polymerization runs showed that the above-cited addition of sodium acetate and the reheating step after the addition of 35 lb of $H_2O$ to the reactor can be deleted without significant detrimental effects on the smoothness of the recovery operation or on polymer properties.

EXAMPLE III

In this example, the particle size distributions of PPS resin recovered by conventional solvent flashing (Example I) and by crystallization and cooling in the presence of water (inventive "water quench" process, Example II) are compared.

The screening analyses were carried out as follows:

Pre-dried PPS resin was first blended in a 5-gallon drum tumbler for 30 minutes. A sample of about 200 grams was placed in a drying oven at 200° F. and dried for about 30 minutes until no more moisture loss occurred. A small amount of carbon black (100-200 mg) was added as an antistatic agent to the PPS sample, which was then shaken manually in a jar.

The dried PPS sample was poured onto the top screen of an electric Cenco-Meinzer sieve shaker (catalog number 18480) and shaken at speed setting "5" (650 cycles per minute) for 30 minutes. After weighing the amount on each screen, the shaking operation was repeated for 10-15 minutes until no more weight change occurred. The sieve battery was tapped with a wooden object before each weighing to loosen particles that clung to the screens. Screening data are listed in Table I.

TABLE I

| | Run 1 (Control) | Run 2 (Invention) |
|---|---|---|
| % greater than 0.1 mm | 64.0 | 99.9 |
| % greater than 0.2 mm | 44.0 | 97.4 |
| % greater than 0.4 mm | 19.0 | 58.0 |
| % greater than 0.7 mm | 4.5 | 6.0 |
| % greater than 2.0 mm | 0 | 0 |

Data in Table I clearly show that the PPS resin of Run 2 (Example II) recovered by the inventive process of cooling the reactor mixture in the presence of water (water quench process) is considerably coarser and thus more easily filterable than PPS of Run 1 (Example I) recovered by conventional solvent flashing. Also the problem of dustiness of the polymer during bagging, shipping and compounding will be considerably less for the coarser resin.

EXAMPLE IV

This example compares the rate of air curing of control PPS resin recovered according to the process described in EXAMPLE I and of a PPS resin recovered by the water quench process of this invention essentially in accordance with the procedure of Example II, with the exception that only water and no sodium acetate was added to the completed polymerization mixture before cooling for PPS precipitation.

PPS samples were heated in air at 507° F. for time intervals of 1-6 hours. The melt flow (expressed in g/10 minutes, determined according to a modified ASTM procedure employing an orifice of 0.0825" diameter, and 0.315" length and an effective weight of 5.0 Kg, including the weight of the piston, at 316° C.) of both polymer samples is listed in Table II.

TABLE II

| | Run 1 (Control) | Run 3 (Invention) |
|---|---|---|
| Melt Flow after 1 hour | 1098 | 1017 |
| Melt Flow after 2 hours | 450 | 423 |
| Melt Flow after 4 hours | 137 | 103 |
| Melt Flow after 6 hours | 45 | 11 |

Data in Table II show that PPS of Run 3 recovered by the inventive water quench process cured faster then the PPS of Run 1 recovered by solvent flashing. The benefit of the higher air cure rate of water quench-recovered PPS would be that the curing capacity of commercial cure vessels would be higher for this PPS resin than for the current blender-flashed PPS resin.

EXAMPLE V

This example shows that a coarse PPS resin, prepared in the presence of sodium acetate as a molecular weight modifier, can be produced without the addition of water before cooling the completed polymerization mixture. The presence of sodium acetate plus water, including water liberated during the polymerization reaction, can effect the separation of the PPS and NMP phases and the precipitation of a coarse, granular resin.

An aqueous sodium sulfide solution was prepared by mixing 72.9 lb of a 50.35 weight percent NaOH solution with 88.2 lb of a solution containing 58.62 weight percent of NaHS and 0.29 weight percent of $Na_2S$. This solution was charged to a stirred pilot plant reactor containing 23.5 lb of sodium acetate and 27.7 gallons of NMP under a nitrogen atmosphere, followed by flushing with 8.0 gallons of NMP. The entire mixture was first heated without evaporation for 10 minutes at about 334° F./17 psig and then dehydrated by raising the temperature to about 449° F. during a period of 95 minutes at a constant pressure of 17 psig.

Subsequently 132.5 lb of DCB were charged to the reactor, and the entire mixture was heated for 2 hours at a temperature ranging from 438° F. (initial) to 450° F., at a pressure ranging from 30 psig (initial) to 65 psig. The reactor temperature was then raised to about 510° F., and the pressure was increased to about 125 psig during a time interval of 22 minutes. Continued heating of the reactor mixture was carried out for 3 hours at about 511° F. and a pressure of 125–150 psig.

About 60 psig of $CO_2$ were charged to the reactor, which was kept at about 512° F./213 psig for 30 minutes. Then the reactor pressure was lowered to about 160 psig, while the temperature was allowed to drop slightly to 508° F. and some solvent vapor was vented. Thereafter, the reactor mixture was cooled to 372° F. during a time interval of about 90 minutes, while being stirred at a rate of 350–400 r.p.m. The pressure dropped to 41 psig after dilution with 60 gallons of deionized water. Filtration and washing was carried out in accordance with the procedure described in Example II. This run is labeled Run 4.

Two additional runs were carried out at essentially the same conditions as outlined above, except that in Run 5 20.0 lb of water and in Run 6 25.0 lb of water were added after the $CO_2$ treatment.

EXAMPLE VI

Screening (sieving) analyses of the resins produced in Runs 4, 5 and 6 were carried out in accordance with the procedure described in Example III. The particle size distribution of these resins is given in Table III.

TABLE III

| Run | Run 4 (Invention) | Run 5 (Invention) | Run 6 (Invention) |
|---|---|---|---|
| Added 1 lb $H_2O$/lb PPS | 0 | 0.20 | 0.25 |
| Total Moles $H_2O$/Mole NMP[a] | 0.30 | 0.66 | 0.75 |
| % greater than 0.1 mm | 99.8 | — | — |
| % greater than 0.2 mm | 97.8 | — | — |
| % greater than 0.4 mm | 73.0 | 98.5 | 99.0 |
| % greater than 0.7 mm | 22.0 | 92.5 | 83.0 |
| % greater than 2.0 mm | 0 | 16 | 10 |

[a]includes residual water liberated during the polymerization

Data in Table III show that PPS of Run 4 with sodium acetate and recovered by quenching the reactor mixture in the presence of residual water is quite coarse and that its particle size distribution compares favorably with that of the resin of Run 2 (see Table I, prepared without sodium acetate during polymerization, recovered by "quenching" with added water). Table III also shows that the addition of water will augment the effect of the residual water in producing even larger polymer particles (Run 5, 6).

EXAMPLE VII

In this example the recovery of PPS prepared in the presence of sodium acetate (added with sodium sulfide before the dehydration) and 1,2,4-trichlorobenzene (TCB, added with DCB after the dehydration) is described. PPS resin prepared with the above-cited ingredients is crosslinked and does not require air curing. It is generally used for extruding films, sheets and fibers and for making molded objects.

PPS resin of this example was prepared essentially in accordance with the polymerization and water quench recovery procedure described in Example V, except that 178 milliliters of TCB and 2 gallons of NMP were added simultaneously with DCB.

Four runs were carried out that differed with respect to the amount of water present after completion of the polymerization reaction and optional $CO_2$ treatment. In Run 7 the post-polymerization mixture was extensively vented so as to expel all water before cool-down for polymer solidification. In run 8 no water was added, but essentially all residual water remained in the post-polymerization mixture during cooling and polymer solidification. In Runs 9 and 10, 12.0 lb of water and 20.0 lb of water, respectively, were added before cooling and polymer solidification.

EXAMPLE VIII

Screening analyses of PPS resins of Runs 7–10 of Example VII were carried out in accordance with the procedure outlined in Example III. Results are given in Table IV.

TABLE IV

| | Run 7 (Control) | Run 8 (Invention) | Run 9 (Invention) | Run 10 (Invention) |
|---|---|---|---|---|
| Added lb $H_2O$/lb PPS | 0[a] | 0 | 0.12 | 0.20 |
| Total Moles $H_2O$/Mole NMP[b] | 0 | 0.30 | 0.516 | 0.661 |
| % greater than 0.1 mm | 10 | — | — | — |
| % greater than 0.2 mm | 5 | 99.6 | 99.9 | 99.8 |
| % greater than 0.4 mm | 3.2 | 86 | 99.8 | 99.0 |
| % greater than 0.7 mm | 2.0 | 37 | 96.5 | 89.0 |
| % greater than 2.0 mm | 0 | 0 | 42 | 40 |

[a]about 0.17 lb of $H_2O$ per lb of PPS was vented from the reactor
[b]includes residual water liberated during the polymerization.

Data in Table IV clearly show that water must be present before cool-down of the post-polymerization mixture in order to produce coarse, granular PPS resin. Water required for the phase separation and solidification of dispersed PPS droplets includes residual water liberated during the polymerization reaction, plus, optionally, about 0.1–0.2 lb of additional water per lb PPS. Data for Runs 9 and 10 show that additional water augments the effect on PPS particle size, and these runs are presently considered the preferred mode of operation.

EXAMPLE IX

Generally, the PPS polymer recovered by the "water quench" process of this invention had a lower ash content than conventional blender-flashed PPS washed with deionized water under equivalent conditions as indicated below.

Blender flashed PPS (Control):

average ash content of 5 samples: 0.41% by weight; range of ash content from 0.31 to 0.61 by weight.

Water quenched PPS (Invention):

average ash content of 7 samples: 0.26% by weight; range of ash content from 0.07 to 0.42% by weight.

It is theorized that the water quenched resin of this invention generally contains less ash (mainly NaCl) because it has been separated more completely from "slime", i.e., low molecular weight phenylene sulfide oligomers that contain a rather large amount of salt (about 3-4 percent by weight). The "slime" passes easily through the 60 mesh filter screens employed for filtering the diluted, water quenched reactor mixture as described in Example II.

The blender-flashed control PPS, on the other hand, appears to incorporate some "slime" during the crystallization by solvent flashing at high temperature. This "slime" that is occluded in or fused onto PPS crystals is obviously not easily removed by washing with hot water and thus contributes to the higher salt content of PPS recovered by solvent flashing at elevated temperature.

EXAMPLE X

In this example the extrusion of fibers from PPS resin recovered by the water quench process of this invention is described. Said resin was prepared according to the procedure described in Example V. This resin had an ash content of 0.15 percent by weight a melt crystallization temperature of 204° C. (determined with a Perkin-Elmer DSC-2C scanning calorimeter by cooling of the polymer melt starting at 320° C.), and a flow rate of 345 g/10 minutes (determined according to a modified ASTM D1238 method employing an orifice of 0.0825" diameter and 0.315" length and an effective weight of 5.0 Kg, including the weight of the piston, at 316° C.).

This granular PPS resin was dried under vacuum conditions at about 110° C. for about 15 hours and then spun into fibers without prior pelletizing. The polymer was extruded in a 1" Wayne Machine and Die Co. extruder through 60/100/200 Dynalloy XIIL/60 mesh filters and a spinneret having 34 holes of 0.48" length and 0.012" diameter, at a rate of about 14 grams per minute. After spinning for about three hours at a block temperature of about 300° F., the pack pressure increased to 1200 psi.

The extruded strand of 34 yellow filaments was drawn over a hot plate of 100° C. to a final draw ratio of 4.0. The denier (weight in grams of 9000 meters) of the drawn strand was 237, the tenaciy was 3.2 grams per denier (gpd), the initial modulus was 45 gpd, and the final elongation was 27%. These tensile properties were determined with an Instron 1122 tensile tester.

EXAMPLE XI

This example describes the extrusion of film from a water quench recovered PPS resin prepared essentially in accordance with the procedure of Example VII. The resin was dried in a vacuum oven at about 110° C. for about 15 hours and was then extruded in a 1" NRM extruder, without prior pelletizing, through a slot die at a temperature of about 320° C. The extruded film was passed over rolls having a temperature of about 75°-79° C. The oriented, slightly gold-colored film was 2 inches wide and 6 mils thick and did not contain any visible bubbles. Its color was lighter than that of films prepared from PPS recovered by conventional solvent flashing in a blender at elevated temperature.

EXAMPLE XII

This example described molding applications of poly(phenylene sulfide) resin recovered by the water quench process of this invention and its cracking resistance as compared to conventional blender-flashed PPS. Molding compounds were prepared according to either Recipe A or Recipe B.

Recipe A 1767 grams of PPS,
1200 grams of Owens Corning 197 B fiberglass of ⅛" length,
30 grams of lithium carbonate,
3 grams of zinc stearate.

Recipe B 1767 grams of PPS,
1200 grams of Owens Corning 497 AA fiberglass of ¼" length,
30 grams of lithium carbonate,
3 grams of zinc stearate.

These components were mixed in a drum tumbler for 2-5 minutes and then compounded using a Davis-standard 1½ inch extruder with a compounding screw at 600° F. and a screw speed of 100-120 r.p.m. The cooled compounds were injection molded for cracking tests after drying at 350° F. for 3-6 hours. Injection molding was carried out in a New Britain 75 B injection molding machine having a disc mold of 2" diameter and ½" thickness, at a mold temperature of 100° F., a barrel temperature of 600° F., an injection time of 5 seconds, an injection hold time of 18 seconds, a cooling time of 150 seconds, an injection pressure of 1000 psig, a hold pressure of 1000 psig, and a cushion thickness of ¼".

18 discs were molded from each compound and treated after cooling as follows: One disc was left as molded. One disc was annealed at 400° F. for two hours for surface examination 8 discs were sawed so as to produce 16 discs of ¼" thickness each; the half of each original disc opposite the sprue was discarded and the sprue half was annealed for two hours and allowed to cool for crack examination 8 discs were annealed at 400° F. for 2 hours, allowed to cool to room temperature for 2 hours, sawed in half as outlined above, and the sprue half was examined for cracks after 24 hours.

Cracking test results are summarized in Table V.

TABLE V

| Run | Recovery Method | Recipe | Number of Discs Cracked | Number of Discs Uncracked |
|---|---|---|---|---|
| 11 (Control) | Blender Flash | A | 8 | 8 |
| 12 (Invention) | Water Quench | A | 5 | 11 |
| 13 (Invention) | Water Quench | A | 0 | 16 |
| 14 (Contol) | Blender Flash | B | 12 | 4 |
| 15 (Control) | Blender Flash | B | 4 | 12 |
| 16 (Invention) | Water Quench | B | 0 | 16 |
| 17 (Invention) | Water Quench | B | 0 | 16 |

Data in Table V show that PPS recovered by the inventive water quench method generally is more crack resistant in fiberglass-filled molded objects than conventional PPS recovered by the blender flash method.

We claim:

1. A method for recovery of granular poly(arylene sulfide) from a polymerization reaction mixture comprising polar organic solvent, poly(arylene sulfide) and alkali metal halide by-product said reaction mixture at a temperature above that at which poly(arylene sulfide) is in molten phase said method comprising, in the presence of a sufficient amount of a separation agent that is soluble in said polar organic solvent and is not a solvent for poly(arylene sulfide) to cause a phase separation of said molten poly(arylene sulfide) from said polar organic solvent, reducing the temperature of said polymerization reaction mixture sufficiently to produce from said polymerization reaction mixture a slurry comprising particulate poly(arylene sulfide) in polar organic solvent.

2. A method for recovery of granular poly(arylene sulfide) from a polymerization reaction mixture comprising polar organic solvent, poly(arylene sulfide) and alkali metal halide by-product said reaction mixture at a temperature above that at which poly(arylene sulfide) is in molten phase said method comprising:

(1) contacting said polymerization reaction mixture with a separation agent that is soluble in said polar organic solvent and is not a solvent for poly(arylene sulfide) in an amount sufficient to cause phase separation of molten poly(arylene sulfide) from polar organic solvent, and (2) subsequently reducing the temperature of said separated phases sufficiently to produce a slurry comprising particulate poly(arylene sulfide) in polar organic solvent.

3. A method of claim 1 or 2 wherein said poly(arylene sulfide) is poly(phenylene sulfide) and said polar organic solvent is N-methyl-2-pyrrolidone (NMP).

4. A method of claim 1 or 2 wherein separation agent present to cause phase separation is in an amount of about 0.01 to about 0.5 pounds of separation agent/pound of polar organic solvent.

5. A method of claim 3 wherein separation agent present to cause phase separation is in an amount of about 0.01 to about 0.5 pounds of separation agent/pound of polar organic solvent.

6. A method of claim 4 wherein at least a portion of said separation agent is water.

7. A method of claim 5 wherein at least a portion of said separation agent is water.

8. A method of claim 4 wherein alkali metal carboxylate is present.

9. A method of claim 5 wherein alkali metal carboxylate is present.

10. A method of claim 6 wherein alkali metal carboxylate is present.

11. A method of claim 7 wherein alkali metal carboxylate is present.

12. A method of claim 1 or 2 wherein said polymerization reaction mixture and water are subjected to agitation during cooling.

13. A method of claim 3 wherein said polymerization reaction mixture and water are subjected to agitation during cooling.

14. A method of claim 1 or 2 wherein said slurry of poly(arylene sulfide) in polar organic solvent is treated further by dilution with water to remove at least a portion of salt present and filtered through screens of opening size to retain the particulate polymer while passing liquid and gelatinous impurities.

15. An integrated system for recovery of granular poly(arylene sulfide) from a polymerization reaction mixture comprising:

(a) producing a slurry comprising particulate poly(arylene sulfide), poly(arylene sulfide) oligomers, sodium chloride and unreacted reactants in polar organic solvent by the method of claim 6, (b) diluting said slurry with water to produce a diluted slurry, (c) optionally, removing vaporizable reactants from said diluted slurry, (d) separating said slurry to produce a filter cake comprising poly(arylene sulfide) and a filtrate comprising arylene sulfide oligomers, water, NaCl dissolved in water, unreacted reactants and polar organic solvent, (e) optionally, reslurrying and refiltering said filter cake comprising poly(arylene sulfide) at least once, and (f) recovering said particulate poly(arylene sulfide) from said filter cake for further processing.

16. A method of claim 15 in which filtrate from steps (d) and (e) is further treated by:

(g) filtering said filtrate through a filter precoated with a material suitable to retain poly(arylene sulfide) oligomers to produce a clarified filtrate comprising NaCl, water, and polar organic solvent, (h) extracting said clarified filtrate using an extractant suitable for extracting polar organic solvent from water containing dissolved NaCl, (i) recovering polar organic solvent from extractant by distillation, and (j) discarding said water containing dissolved NaCl.

17. An integrated system for recovery of granular poly(arylene sulfide) from a polymerization reaction mixture comprising:

(a) producing a slurry comprising particulate poly(arylene sulfide), poly(arylene sulfide) oligomers, sodium chloride and unreacted reactants in polar organic solvent by the method of claim 8, (b) diluting said slurry with water to produce a diluted slurry, (c) optionally, removing vaporizable reactants from said diluted slurry, (d) separating said slurry to produce a filter cake comprising polyarylene sulfide and a filtrate comprising arylene sulfide oligomers, water, NaCl dissolved in water, unreacted reactants and polar organic solvent, (e) optionally, reslurrying and refiltering said filter cake comprising poly(arylene sulfide) at least once, and (f) recovering said particulate poly(arylene sulfide) from said filter cake for further processing.

18. A method of claim 17 in which filtrate from steps (d) and (e) is further treated by:

(g) filtering said filtrate through a filter precoated with a material suitable to retain poly(arylene sulfide) oligomers to produce a clarified filtrate comprising NaCl, water, and polar organic solvent, (h) extracting said clarified filtrate using an extractant suitable for extracting polar organic solvent from water containing dissolved NaCl, (i) recovering polar organic solvent from extractant by distillation, and (j) discarding said water containing dissolved NaCl.

19. A method of claim 15 wherein poly(arylene sulfide) is poly(phenylene sulfide) and said polar organic solvent is N-methyl-2-pyrrolidone (NMP).

20. A method of claim 17 wherein poly(arylene sulfide) is poly(phenylene sulfide) and said polar organic solvent is N-methyl-2-pyrrolidone (NMP).

21. A method of claim 18 wherein poly(arylene sulfide) is poly(phenylene sulfide), said organic solvent is N-methyl-pyrrolidone (NMP), and said extractant is n-hexanol.

22. A method for producing fiber, film, or sheets comprising extruding poly(phenylene sulfide) recovered by the method of claim 15.

23. A method for producing an article of manufacture comprising molding poly(phenylene sulfide) recovered by the method of claim 15.

24. A method for producing an article of manufacture comprising extruding poly(phenylene sulfide) recovered by the method of claim 17.

25. A method for producing an article of manufacture comprising molding poly(phenylene sulfide) recovered by the method of claim 17.

* * * * *